(12) United States Patent
Nichols et al.

(10) Patent No.: US 8,094,021 B2
(45) Date of Patent: Jan. 10, 2012

(54) MONETARY PACKAGE SECURITY DURING TRANSPORT THROUGH CASH SUPPLY CHAIN

(75) Inventors: Michelle Nichols, Rock Hill, SC (US); Todd Atwood, Charlotte, NC (US); James Heddleson, Charlotte, NC (US); Felix Mon, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 301 days.

(21) Appl. No.: 12/262,522

(22) Filed: Oct. 31, 2008

(65) Prior Publication Data
US 2009/0309729 A1 Dec. 17, 2009

Related U.S. Application Data

(60) Provisional application No. 61/061,987, filed on Jun. 16, 2008.

(51) Int. Cl.
*G08B 13/14* (2006.01)
(52) U.S. Cl. ........ 340/568.7; 340/539.13; 340/539.23; 340/568.1; 340/572.4; 235/379; 235/385
(58) Field of Classification Search .......... 340/568.7, 340/568.1, 572.1, 572.4, 539.11, 539.23, 340/825.49, 539.13; 235/375, 379, 385
See application file for complete search history.

(56) References Cited

U.S. PATENT DOCUMENTS

| | | | |
|---|---|---|---|
| 3,618,059 A * | 11/1971 | Allen | 340/568.1 |
| 4,352,097 A | 9/1982 | Hamann | |
| 4,443,692 A | 4/1984 | Nishimura | |
| 5,453,601 A | 9/1995 | Rosen | |
| 5,689,240 A | 11/1997 | Traxler | |
| 5,748,906 A | 5/1998 | Sandig | |
| 5,748,908 A | 5/1998 | Yu | |
| 5,952,920 A | 9/1999 | Braddick | |
| 5,953,423 A | 9/1999 | Rosen | |
| 5,963,131 A | 10/1999 | D'Angelo et al. | |
| 6,028,517 A | 2/2000 | Sansone et al. | |

(Continued)

FOREIGN PATENT DOCUMENTS
DE 4019265 11/1991
(Continued)

OTHER PUBLICATIONS

Powerpoint Presentation, DTS Product Overview, IFS, Apr. 2006, 17 pages.

(Continued)

*Primary Examiner* — George Bugg
*Assistant Examiner* — Anne Lai
(74) *Attorney, Agent, or Firm* — Banner & Witcoff, Ltd.

(57) ABSTRACT

An armored carrier or other transport entity may scan a remotely-readable identification tag, such as a radio-frequency identification (RFID) tag, of each monetary package being picked up and/or delivered. The scanner used by the armored carrier may notify the armored carrier if one of the monetary packages goes out of range without being checked out, such as within a period of time. Also, if that monetary package is not returned within range within a particular period of time, the scanner may automatically notify a centralized system. The scanner may further be aware of scheduled monetary packages to be picked up. If not all of the monetary packages as expected are picked up, then the scanner may also notify the armored carrier.

14 Claims, 6 Drawing Sheets

U.S. PATENT DOCUMENTS

| | | | |
|---|---|---|---|
| 6,047,807 | A | 4/2000 | Molbak |
| 6,055,438 | A | 4/2000 | Winner, Jr. |
| 6,122,625 | A | 9/2000 | Rosen |
| 6,167,378 | A | 12/2000 | Webber, Jr. |
| 6,483,433 | B2 | 11/2002 | Moskowitz et al. |
| 6,487,542 | B2 | 11/2002 | Ebata et al. |
| 6,491,216 | B1 | 12/2002 | May |
| 6,498,603 | B1 | 12/2002 | Wallace |
| 6,526,273 | B1 | 2/2003 | Link, II et al. |
| 6,633,881 | B2 | 10/2003 | Drobish et al. |
| 6,736,314 | B2 | 5/2004 | Cooper et al. |
| 6,788,203 | B1 | 9/2004 | Roxbury et al. |
| 6,845,905 | B2 * | 1/2005 | Blad et al. .............. 235/375 |
| 7,004,385 | B1 | 2/2006 | Douglass |
| 7,042,360 | B2 * | 5/2006 | Light et al. .............. 340/572.1 |
| 7,076,458 | B2 | 7/2006 | Lawlor et al. |
| 7,201,313 | B1 | 4/2007 | Ramachandran |
| 7,212,992 | B1 | 5/2007 | Kanevsky et al. |
| 7,216,800 | B1 | 5/2007 | Ramachandran |
| 7,243,080 | B2 | 7/2007 | Bhadra |
| 7,248,160 | B2 * | 7/2007 | Mangan et al. .......... 340/539.13 |
| 7,284,692 | B1 | 10/2007 | Douglass |
| 7,348,886 | B2 | 3/2008 | Himberger et al. |
| 7,350,230 | B2 | 3/2008 | Forrest |
| 7,375,638 | B2 * | 5/2008 | Light et al. .............. 340/572.4 |
| 7,461,780 | B2 | 12/2008 | Potts et al. |
| 7,474,217 | B2 | 1/2009 | Himberger et al. |
| 7,577,612 | B2 | 8/2009 | Waller et al. |
| 7,588,185 | B2 * | 9/2009 | Berquist et al. ............... 235/385 |
| 7,623,033 | B2 * | 11/2009 | Ainsworth et al. ........ 340/568.1 |
| 7,659,816 | B2 | 2/2010 | Wandel |
| 7,714,708 | B2 | 5/2010 | Brackmann et al. |
| 7,719,423 | B2 | 5/2010 | Himberger et al. |
| 7,748,610 | B2 | 7/2010 | Bell et al. |
| 2001/0051922 | A1 | 12/2001 | Waller et al. |
| 2001/0054643 | A1 | 12/2001 | Siemens |
| 2002/0052193 | A1 | 5/2002 | Chetty |
| 2002/0052794 | A1 | 5/2002 | Bhadra |
| 2002/0091937 | A1 | 7/2002 | Ortiz |
| 2002/0095588 | A1 | 7/2002 | Shigematsu et al. |
| 2002/0138424 | A1 | 9/2002 | Coyle |
| 2002/0194122 | A1 | 12/2002 | Knox et al. |
| 2002/0195309 | A1 | 12/2002 | Pope |
| 2003/0011466 | A1 | 1/2003 | Samuel et al. |
| 2003/0050891 | A1 | 3/2003 | Cohen |
| 2003/0061153 | A1 | 3/2003 | Birdsong et al. |
| 2003/0083936 | A1 | 5/2003 | Mueller et al. |
| 2003/0122671 | A1 | 7/2003 | Jespersen |
| 2003/0163710 | A1 | 8/2003 | Ortiz et al. |
| 2003/0177102 | A1 | 9/2003 | Robinson |
| 2003/0208431 | A1 | 11/2003 | Raynes et al. |
| 2003/0213843 | A1 | 11/2003 | Jackson |
| 2003/0234719 | A1 | 12/2003 | Denison et al. |
| 2004/0016796 | A1 | 1/2004 | Hanna et al. |
| 2004/0056767 | A1 | 3/2004 | Porter |
| 2004/0083149 | A1 | 4/2004 | Jones |
| 2004/0100379 | A1 | 5/2004 | Boman et al. |
| 2004/0111346 | A1 | 6/2004 | Macbeath et al. |
| 2004/0124966 | A1 | 7/2004 | Forrest |
| 2004/0201454 | A1 * | 10/2004 | Waterhouse et al. ........ 340/10.1 |
| 2005/0091129 | A1 | 4/2005 | Tien |
| 2005/0108164 | A1 | 5/2005 | Solafia, III et al. |
| 2005/0183928 | A1 | 8/2005 | Jones et al. |
| 2005/0258234 | A1 * | 11/2005 | Silverbrook et al. ......... 235/379 |
| 2005/0273347 | A1 | 12/2005 | Dudley et al. |
| 2006/0131395 | A1 | 6/2006 | Potts et al. |
| 2006/0247973 | A1 | 11/2006 | Mueller et al. |
| 2006/0271441 | A1 | 11/2006 | Mueller et al. |
| 2006/0282277 | A1 | 12/2006 | Ng |
| 2006/0288233 | A1 | 12/2006 | Kozlay |
| 2007/0005452 | A1 | 1/2007 | Klingenberg et al. |
| 2007/0008118 | A1 | 1/2007 | Kassiedass |
| 2007/0012602 | A1 | 1/2007 | Baldassari et al. |
| 2007/0034693 | A1 | 2/2007 | Jouvin et al. |
| 2007/0063016 | A1 | 3/2007 | Myatt et al. |
| 2007/0174156 | A1 | 7/2007 | Emde et al. |
| 2007/0226142 | A1 | 9/2007 | Hanna et al. |
| 2007/0282724 | A1 | 12/2007 | Barnes et al. |
| 2008/0005019 | A1 | 1/2008 | Hansen |
| 2008/0005578 | A1 | 1/2008 | Shafir |
| 2008/0103959 | A1 | 5/2008 | Carroll et al. |
| 2008/0120237 | A1 | 5/2008 | Lin |
| 2008/0149706 | A1 | 6/2008 | Brown et al. |
| 2008/0155269 | A1 | 6/2008 | Yoshikawa |
| 2008/0199155 | A1 | 8/2008 | Hagens et al. |
| 2008/0223930 | A1 | 9/2008 | Rolland et al. |
| 2008/0262949 | A1 | 10/2008 | Bond et al. |
| 2008/0265019 | A1 | 10/2008 | Artino et al. |
| 2008/0303903 | A1 | 12/2008 | Bentley et al. |
| 2009/0006249 | A1 | 1/2009 | Morgan et al. |
| 2009/0006250 | A1 | 1/2009 | Bixler et al. |
| 2009/0032580 | A1 | 2/2009 | Blachowicz et al. |
| 2009/0051566 | A1 | 2/2009 | Olsen et al. |
| 2009/0051769 | A1 | 2/2009 | Kuo et al. |
| 2009/0065573 | A1 | 3/2009 | Potts et al. |
| 2009/0107800 | A1 | 4/2009 | Nishida et al. |
| 2009/0114716 | A1 | 5/2009 | Ramachandran |
| 2009/0164364 | A1 | 6/2009 | Galit et al. |
| 2009/0187482 | A1 | 7/2009 | Blount et al. |
| 2010/0052844 | A1 | 3/2010 | Wesby |
| 2010/0274723 | A1 | 10/2010 | Joab |

FOREIGN PATENT DOCUMENTS

| | | |
|---|---|---|
| DE | 4429815 | 2/1996 |
| DE | 19512045 | 10/1996 |
| DE | 19846452 | 12/1999 |
| DE | 102004039365 | 2/2006 |
| DE | 102005047711 | 4/2007 |
| EP | 1477949 | 11/2004 |
| GB | 2304953 A * | 3/1997 |
| WO | 9933040 | 7/1999 |
| WO | 03034359 | 4/2003 |
| WO | 2005041385 | 5/2005 |
| WO | 2005106722 | 11/2005 |

OTHER PUBLICATIONS

Durbin, "Ford's F-150 goes high-tech", retrieved from <http://www.wheels.ca/article/173134>, Feb. 6, 2008, 4 pages.

Monthly Minutes from Banking Technology Operations Standing Committee (BTO), dated Mar. 20, 2007, 2 pages.

Hem, "Adaptation/Loomis cashes in on technology/The armored car company defies obsolescence despite a declining use of coins and bills", Houston Chronicle, retrieved from <http://www.chron.com/CDA/archives/archive.mpl?id=2008_4523451>, Mar. 1, 2008, 2 pages.

Powerpoint Presentation, Guck, "PakTrak", Cash Shipment Package Tracking Concept Overview, Draft-Version 1.0, Mar. 14, 2008, 17 pages.

Powerpoint Presentation, RFID in Banking, May 21, 2008, 12 pages.

Monthly Minutes for RFID SIG dated Mar. 19, 2008, 2 pages.

Non-Final Office Action in U.S. Appl. No. 12/262,523 dated Nov. 9, 2010.

Final Office Action in U.S. Appl. No. 12/262,526 dated Nov. 23, 2010.

Non-Final Office Action in U.S. Appl. No. 12/262,928 dated Nov. 10, 2010.

Non-Final Office Action in U.S. Appl. No. 12/263,115 dated Nov. 16, 2010.

Non-Final Office Action in U.S. Appl. No. 12/262,532 dated Nov. 26, 2010.

Notice of Allowance in U.S. Appl. No. 12/262,502 dated Oct. 19, 2010.

Non-Final Office Action for U.S. Appl. No. 12/262,448 dated Sep. 15, 2010.

Non-Final Office Action for U.S. Appl. No. 12/262,526 dated Sep. 16, 2010.

Non-Final Office Action for U.S. Appl. No. 12/262,472, dated Oct. 18, 2010.

Non-Final Office Action for U.S. Appl. No. 12/262,534, dated Oct. 14, 2010.

International Search Report and Written Opinion for PCT/US2009/047452, mailed Aug. 25, 2009.

Final Office Action for U.S. Appl. No. 12/262,908 dated Aug. 18, 2010.
Non-Final Office Action for U.S. Appl. No. 12/262,432 dated Aug. 18, 2010.
Non-Final Office Action for U.S. Appl. No. 12/263,041 dated Sep. 2, 2010.
European Search Report in EP09007879 dated Oct. 1, 2009.
European Search Report in EP09007878 dated Oct. 1, 2009.
Office Action from related U.S. Appl. No. 12/262,534 dated Jun. 24, 2010.
Office Action from related U.S. Appl. No. 12/263,041 dated Mar. 12, 2010.
Office Action from related U.S. Appl. No. 12/262,908 dated Mar. 8, 2010.
Final Office in U.S. Appl. No. 12/263,041 dated Jan. 26, 2011.
Final Office in U.S. Appl. No. 12/262,448 dated Feb. 1, 2011.
Final Office in U.S. Appl. No. 12/262,432 dated Dec. 7, 2010.
Office Action in EP 09007878.3-2211 dated Feb. 15, 2011.

* cited by examiner

MONETARY PACKAGE SECURITY DURING TRANSPORT THROUGH CASH SUPPLY CHAIN

CROSS-REFERENCE TO RELATED APPLICATIONS

This application claims priority to U.S. provisional patent application Ser. No. 61/061,987, filed Jun. 16, 2008, entitled "Cash Supply Chain Improvements," hereby incorporated herein by reference as to its entirety.

BACKGROUND

The cash supply chain is manual, complex, has inherent risk issues, and is dispersed throughout a network of customers, armored carriers, the Fed (Federal Reserve), and/or a network of client facing devices including but not limited to automatic teller machines (ATMs), vaults, banking centers, safes, cash recyclers, and other cash handling devices. The costs of depositing, distributing, and managing cash across a major bank, as well as the amount of daily excess cash carried by such a bank, can be on the order of billions of dollars.

Today's client deposit process does not adequately allow clients to view the status of their deposit bag as it makes its way from the client's site where the deposit was prepared to the bank or bank's representative who will continue the processing of the deposit. Deposit bags are handled multiple times in the current process (and possibly by many different parties), which increases potential errors and complicates finding missing deposits or understanding where errors occurred and assigning fiduciary responsibility for those errors. Pertinent pieces of deposit data are typically manually entered and reentered into various systems throughout the end-to-end processing of the deposit. The collaboration and sharing of information across multiple organizations and with multiple vendors may make this process very complex and increases risk to the bank and bank clients.

SUMMARY

Aspects as described herein are directed to tracking monetary packages, which may contain monetary items such as foreign and domestic government-issued legal-tender paper currency, coins, checks, coupons, food stamps, credit cards, negotiable money orders, and/or other negotiable instruments as well as non-negotiable collateral information, throughout the cash supply chain. In carrying out daily financial transactions, it is typical for monetary packages to be physically transferred between various parties, such as but not limited to a bank client (or a client of another financial institution who is leveraging the services of the bank), a transporter (e.g., an armored carrier), a bank vault, and even various stations within a bank vault. This transfer amongst various parties is referred to as the cash supply chain. Because many types of cash are reusable/recyclable, the same physical cash is usually cycled through the cash supply chain multiple times.

For transport through the cash supply chain, a financial transaction such as a deposit including one or more monetary items is normally bundled or otherwise packaged together as a monetary package. Depending upon the location within the cash supply chain, the monetary package may maintain together a quantity of monetary items as a single entity by way of, e.g., a bag (in which the monetary items are placed within the bag, which may be sealed), by way of a cassette for holding the monetary items, and/or by way of one or more straps (which may also be within the bag).

While a number of techniques to automate transaction handling have been attempted, there remains a need to increase the efficiency and accuracy of the financial transaction process. Consequently, it is desirable to increase the speed and accuracy of the financial transactions and to reduce the labor required to perform the transactions. It is also desirable to make information relating to the financial transaction rapidly available to the client, third party vendors, and the bank, and to identify more quickly problematic locations in the financial transaction, identify potential theft, fraud or embezzlement, and identify industry trends. Information about a deposit or withdrawal, for instance, should be provided in an expeditious fashion as it is processed along a cash supply chain, where notification/reporting is customizable and automatic for enhancing the client's experience and for improving internal processes of a bank. According to further aspects, monetary packages are tracked via a centralized tracking system that communicates with the various parties handling the monetary packages throughout the entire supply chain and/or when a carrier is set to arrive. Each time a monetary package changes status in the cash supply chain (e.g., transfers from one party to another or changes physical location), an involved party (e.g., the party receiving the monetary package and/or the party providing the monetary package) updates the centralized tracking system with the status. The centralized tracking system may be updated using a network of automated sensors that do not necessarily require the intervention of a party to create the update. These updates may be communicated to the centralized tracking system (system of record) in real time or near real time. Such a centralized tracking system may allow the bank or other service provider to offer a variety of services to the client.

For instance, centralized monetary package tracking may allow for more accurate reporting of monetary package status. And, by pre-scheduling (initiation) of deposits and change orders into the centralized tracking system, anomalies in the transport of a monetary package (e.g., a lost or delayed monetary package) may be recognized much earlier, even prior to actual deposit or arrival of the package at the processing site.

Still further aspects are directed to providing a more secure transport mechanism through the cash supply chain. In particular, an armored carrier or other transport entity may scan a remotely-readable identification tag, such as a radio-frequency identification (RFID) tag, of each monetary package being picked up and/or delivered. The scanner used by the armored carrier may notify the armored carrier if one of the monetary packages goes out of range without being checked out, such as within a period of time. Also, if that monetary package is not returned within range within a particular period of time, the scanner may automatically notify a centralized system. The scanner may further be aware of scheduled monetary packages to be picked up. If not all of the monetary packages as expected are picked up, then the scanner may also notify the armored carrier.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
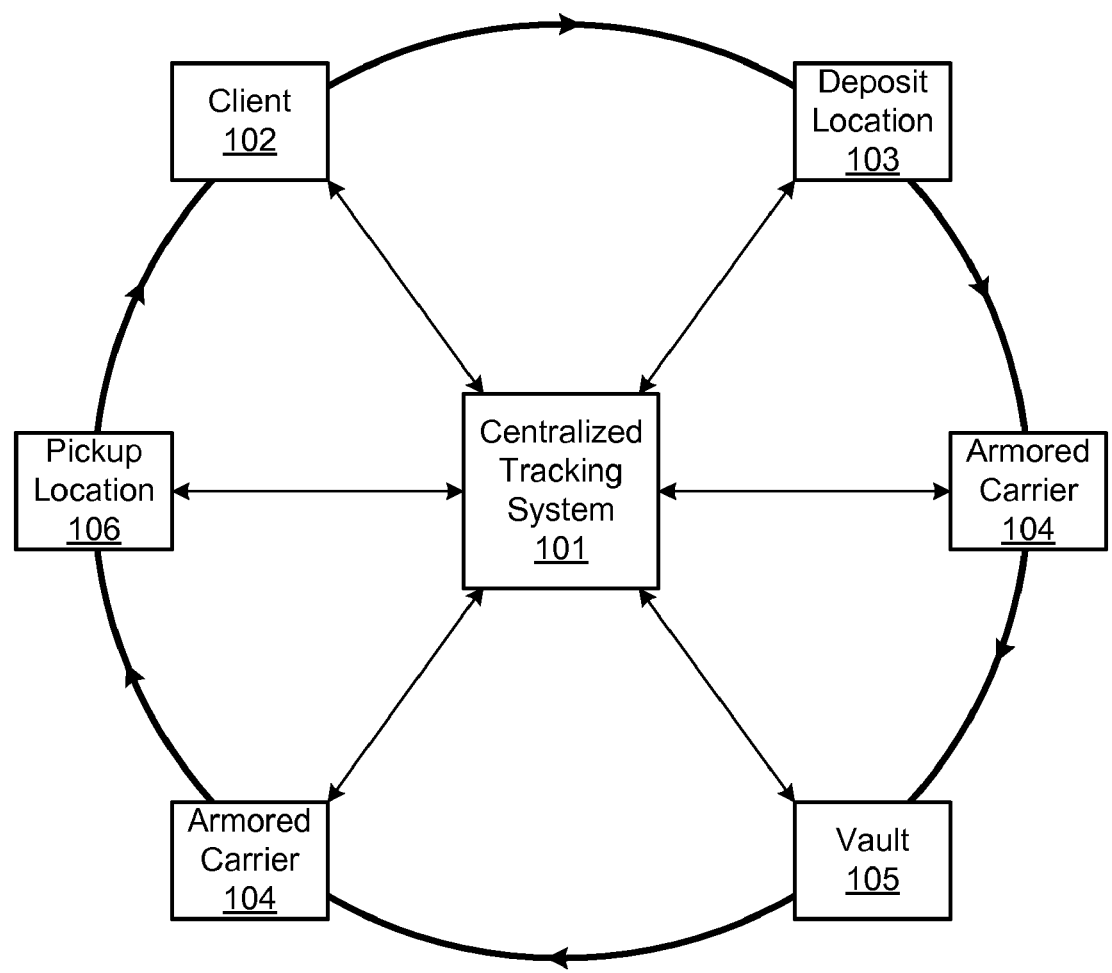
FIG. 1 is a graphical depiction of an illustrative cash supply chain for a deposit/withdrawal lifecycle, including a centralized tracking system.

FIG. 1 is a graphical depiction of an illustrative cash supply chain for a monetary item deposit/withdrawal lifecycle. In this example, a centralized tracking system 101 communicates with various parties, such as a bank client 102, a deposit location 103, an armored carrier 104 or other transport service, a bank vault 105, and a pickup location 106. Communication between centralized tracking system 101 and the various parties 102-106 may be performed across any one or more communication media. Examples of communication media include, but are not limited to, a network such as the Internet, a local-area network or LAN, a wireless LAN or WLAN, and/or a telephone network such as a landline telephone network and/or a cellular telephone network. Other examples of communication media include a dedicated landline link and/or satellite or other wireless link. While not explicitly shown, monetary items may be processed internally within a node (e.g., within bank vault 105). Consequently, each node may have a network within itself.

Centralized tracking system 101 may include at least one computing device and at least one computer-readable medium that, together, are configured to receive monetary package status reports from parties such as parties 102-106, maintain data representing the monetary package status, and generate reports and alert messages from that monetary package status data. A "computing device" as referred to herein includes any electronic, electro-optical, and/or mechanical device, or system of physically separate such devices, that is able to process and manipulate information, such as in the form of data. Non-limiting examples of a computing device includes one or more personal computers (e.g., desktop or laptop), servers, personal digital assistants (PDAs), ultra mobile personal computers, smart phones, cellular telephones, pagers, and/or a system of these in any combination. In addition, a given computing device may be physically located completely in one location or may be distributed amongst a plurality of locations (i.e., may implement distributive computing). A computing device may even be a mobile device. Centralized tracking system 101 may further support co-operation with other non-bank tracking systems.

A computing device typically includes both hardware and software. The software may be stored on a computer-readable medium in the form of computer-readable instructions. A computing device may read those computer-readable instructions, and in response perform various steps as defined by those computer-readable instructions. Thus, any functions attributed to a computing device as described herein may be defined by such computer-readable instructions read and executed by that computing device, and/or by any hardware (e.g., a processor) from which the computing device is composed.

The term "computer-readable medium" as used herein includes not only a single medium or single type of medium, but also a combination of one or more media and/or types of media. Such a computer-readable medium may store computer-readable instructions (e.g., software) and/or computer-readable data (i.e., information that may or may not be executable).

Referring again to FIG. 1, bank client 102 may include not only registered customers of a bank that have a financial account (e.g., checking or savings account) maintained by the bank, but also customers that do not have a financial account with the bank but are otherwise doing business with the bank. Clients may also be another bank or a bank agent or business partner including local, state, or federal governments, and may also be extended to include a chain of a bank's customer's customers. As will be discussed, bank client 102 may receive a notification of an event along the cash supply chain at phone 102a or terminal 102b through a wireless network or the Internet.

Deposit location 103 is the location at which client 102 releases custody of the deposit (such as in the form of a monetary package). This custody may be released by, for instance, depositing the cash into a cash handling device (e.g., a cash recycler, depository, exchange, dispensing machine, or ATM), or at a bank teller, or even at the client's own location where an armored carrier would pick up the deposit from the client. Pickup location 106 is the location at which client 102 receives custody of the monetary items (which may or may not be prepared by client 102 and which may be in the form of a monetary package), such as from an armored carrier, bank teller, or cash handling device.

Vault 105 is typically a secured location or device in a bank or customer's office where the deposit is processed. In the case of a vault in an armored carrier's or bank's facility, once the deposits are processed, currency or other monetary items are strapped for storage and distribution. A vault may not only process incoming monetary items but may also provide monetary items such as currency to clients. These requests for currency, commonly called "change orders," are generally standing orders for specific amounts that are sent on a specific schedule, but can be on-demand or non-standing orders that are requested for a specific time. With some embodiments, currency may be verified by the one transporting the currency. This may be because the carrier is trusted and in an appropriate liability agreement with the bank, or the bank owns a carrier. In that case, some or all of the funds may be verified (or trusted due to the device the funds came from) and re-used in the cash supply chain without going to the vault. For example, the carrier may use a hand-held device to check the next location to visit or receive notices that a site needs cash. The carrier may use the verified cash to fulfill the order.

Armored carrier 104a/104b (which may be referred to as a "vendor") transports cash packages between different stages along the cash supply chain typically in an armored vehicle. The physical transportation could be any type of transportation, however, including a courier or package delivery service with a secured package.

Parties 102-106 may communicate with centralized tracking system 101 over corresponding communications channels. Different types of communications channels may be supported. For example, centralized tracking system 101 may communicate with client 102 through a computer terminal (via the Internet) and/or a wireless telephone, with an armored carrier through a handheld scanner with a wireless communications interface, and with a bank employee through a work station (e.g., via an intranet). A communications channel may utilize different communications media, including a wired telephone channel, wireless telephone channel, and/or wide area channel (WAN).

Figure 2:
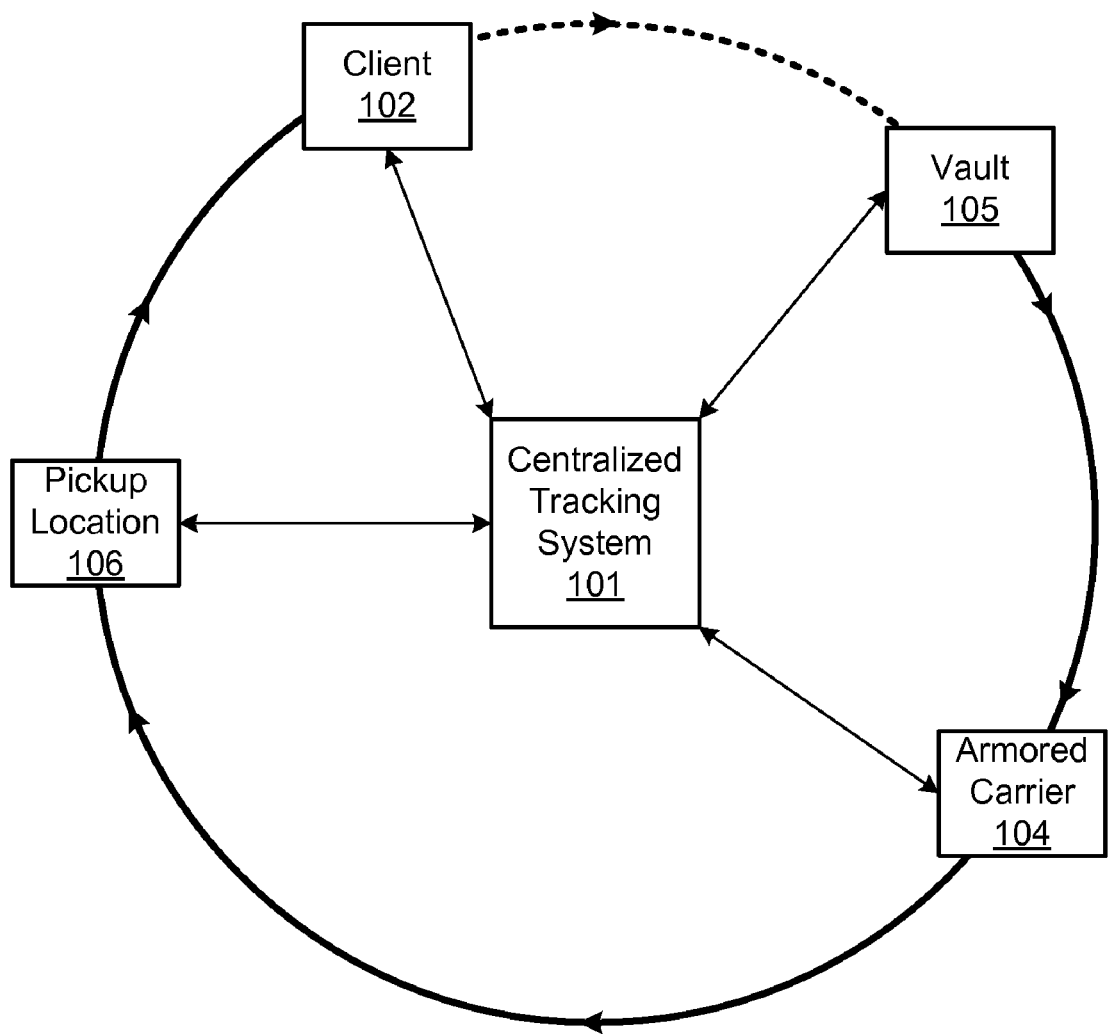
FIG. 2 is a graphical depiction of an illustrative cash supply chain for a change order lifecycle, including a centralized tracking system.

FIG. 2 is a graphical depiction of an illustrative cash supply chain for a change order lifecycle. A change order is a financial transaction in which a client (such as client 102) requests and receives a predefined sum in a predefined set of one or more denominations. For example, client 102 might request a particular amount of currency with X amount of ten dollar bills, Y amount of twenty dollar bills, and Z amount of one dollar bills. While any type of client may implement a change order, this type of transaction is particularly common for business clients that require a certain amount of currency in hand each day for their cash registers. With some embodiments, a change order may be initiated by the bank using forecasting systems for cash handling devices.

As can be seen in FIGS. 1 and 2, a monetary package transfers from party to party, with the exception of the broken line in FIG. 2 that indicates a request by client 102 rather than a physical transfer of a monetary package. Each time the monetary package changes hands and/or changes physical locations, centralized tracking system 101 may be updated. A physical location may two different nodes, or within the same node, of the cash supply chain. For example, monetary items are typically moved from receiving of a vault to a teller of the vault. In addition, any of these parties (or even other parties not shown) may at any time query centralized tracking system 101 to determine the current status, historical status, and planned future status of the monetary package. To aid in tracking monetary packages, each monetary package may physically include an identifying device having an associated identifier that is unique to that monetary package. The identifying device may be any device that stores human-readable and/or computer-readable information on some type of medium. Examples of such an identifying device include a radio-frequency identification (RFID) tag or other wirelessly readable tag, a bar code or other visual label, or printed ink made directly on or in the monetary package. The identifier itself may be made up of any one or more symbols that together make up a unique combination, such as one or more numbers, letters, icons, dots, lines, and/or any one-, two-, or higher-dimensional patterns.

Figure 3:
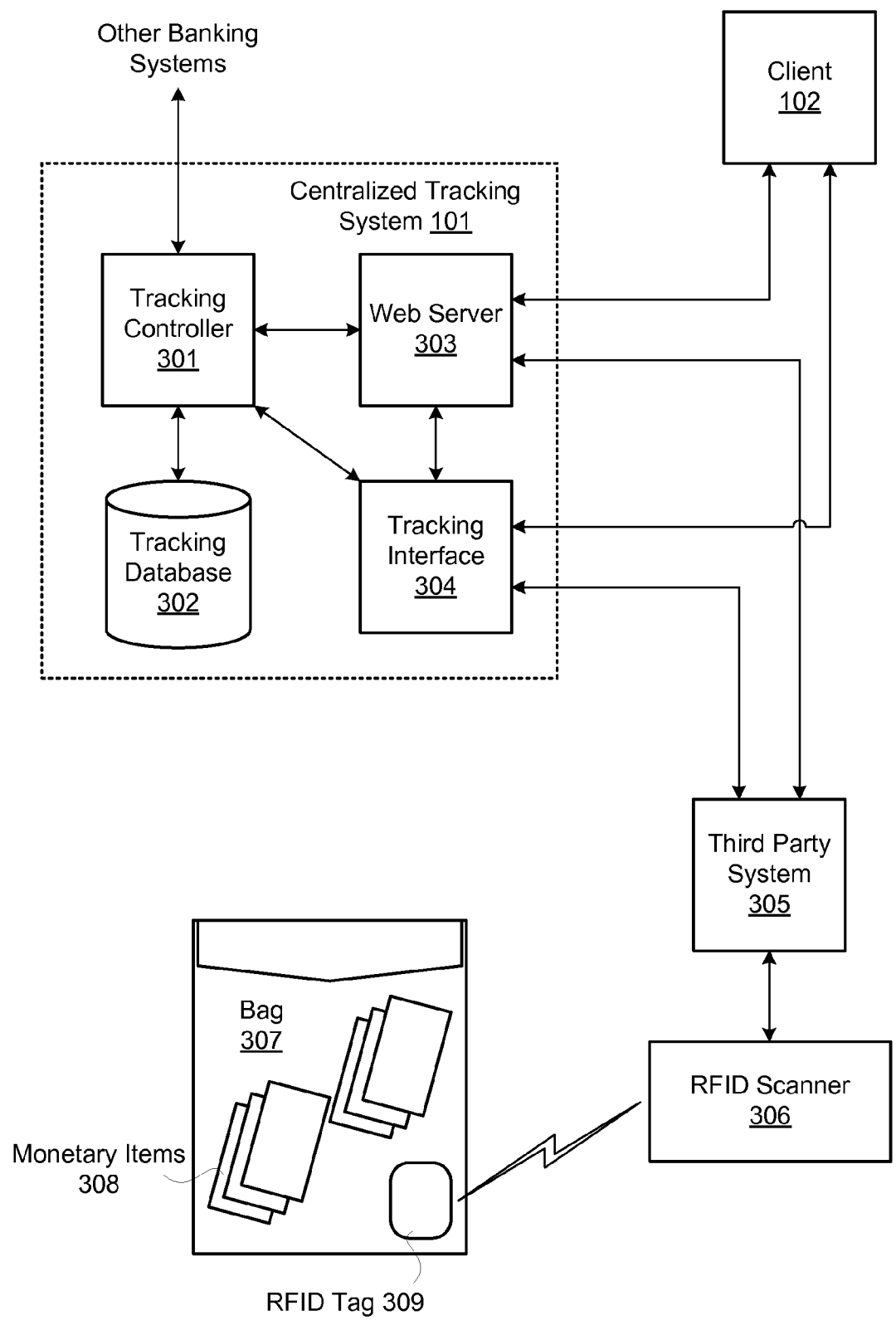
FIG. 3 is a functional block diagram of an illustrative monetary package tracking environment.

FIG. 3 is a functional block diagram of an illustrative monetary package tracking environment. In this example, centralized tracking system 101 is shown to include a tracking controller 301, tracking database 302, a web server 303, and a tracking interface 304. Each of units 301, 303, and 304 may be implemented as or otherwise include a computing device. It should be noted that the divisions between functional blocks in FIG. 3 is merely illustrative, and that the physical division of computing devices and other equipment may be different from the functional division. Moreover, some or all of the functional blocks may be combined or further subdivided functionally and/or physically.

Tracking database 302 may be implemented as or otherwise include a computer-readable medium for storing data. This data may be organized, for instance, as a relational database that is responsive to queries such as structured query language (SQL) queries. Tracking database 302 may be distributed and may collaborate with internal and/or external sources to fulfill the completeness of the data utilized for notifications.

In this example, tracking controller 301 may be configured to add, edit, update, delete, and query data stored in tracking database 302. The data stored in tracking database 302 may include, for instance, data indicating the current status of each of a plurality of monetary packages. For example, the data may indicate that a given monetary package is with a particular armored carrier, and that it was transferred to the armored carrier at a certain time on a certain date. The status data may be associated with the unique identifier of the relevant monetary package.

Web server 303 may be configured to generate an Internet web page that is accessible by client 102 and/or other parties. The web page may be used to query tracking database 302 via tracking controller 301. For example, a party using the web page may be able to enter an identifier associated with a monetary package. In response, web server 303 may request tracking controller 301 to query tracking database 302 (or alternatively web server 303 may generate the query itself) for that identifier. The query response is forwarded by tracking controller 301 to web server 303, and displayed on the web page for review by the party. The query response may include, for instance, the status data associated with the identifier. Many other types of query transactions are possible. In addition, updates, deletions, and additions may be made to the data in tracking database 302 via the web page generated by web server 303. For example, a party may desire to update status information about a particular monetary package via the web site, or may desire to add a new monetary package with a new identifier not previously included in tracking database 302.

Tracking interface 304 may be used as an alternative interface into tracking controller 301 and tracking database 302, without the need for an Internet web page. For example, data and queries may be provided to tracking controller 301 via tracking interface 304 using a short messaging system (SMS) message or other type of messaging from a cellular telephone.

FIG. 3 further shows an example of a third party system 305 (e.g., the computer system of armored carrier 104). System 305 may be embodied as or otherwise include a computing device, and may further include or be coupled with an identifier reader such as an RFID scanner 306 or a bar code reader. In this example, RFID scanner is configured to read an RFID tag 309 that is attached to or contained inside a bag 307 that also contains a quantity of monetary items 308. Using such a setup, the third party may, for example, read the identifier stored in RFID tag 309 using RFID scanner 306 (which may be a handheld or fixed location device), forward that identifier to tracking interface 304 or web server 303 along with the current status of bag 307 (e.g., in custody of the bank vault at a certain time and date). This current status may be added to the data in tracking database 302 and associated with the identifier. Then, when that party or another party later queries tracking database 302 for the same identifier, the status of bag 307, including the most recent status discuss above, may be returned in response to the query.

The above discussion in connection with FIGS. 1-3 describes but a few examples of how monetary package tracking might be implemented. These and other implementations, as well as various features that may be provided in connection with monetary package tracking, will be discussed in further detail below.

Figure 4:
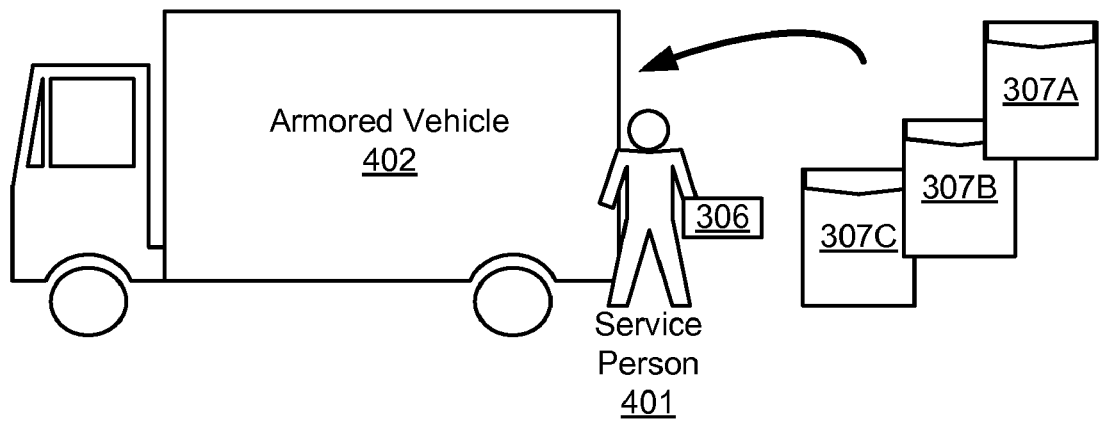
FIG. 4 shows an example of an armored carrier pickup transactions.

FIG. 4 shows an example of a service person 401 (such as armored carrier 104 or a banking center employee) making a pickup of one or more monetary items. In this example, service person 401 has RFID scanner 306 in his or her possession, and is thus able to remotely and wirelessly detect the presence of various bags 307A, 307B, 307C (or other types of monetary packages) that are located within scanning range of RFID scanner 306 and that include an RFID tag such as RFID tag 309. The service person or associate may also tag the bag with an RFID tag and associate the bar code on the bag with the RFID tag, or just scan the bar code. Service person 401 may also have a vehicle such as armored vehicle 402 in which the various bags for pickup 307A-C are to be placed for transport through a subsequent portion of the cash supply chain. RFID scanner 306 may be physically attached to service person's 401 body (e.g., attached to his or her belt), or be in service person's hand, or be attached to armored vehicle 402.

In general, service person 401 may use RFID scanner 306 to identify the presence of bags 307A-C prior to, during, or after placing bags 307A-C into armored vehicle 402. The identifiers of the RFID tags for the various bags 307A-C may be automatically stored in RFID scanner 306, and wirelessly transmitted to a communication network so as to be ultimately received by centralized tracking system 101 via tracking interface 304 and/or web server 303. A status indicating that the bags associated with those identifiers have been picked up by service person 401 may also be wirelessly transmitted to centralized tracking system 101. In response, centralized tracking system 101 may associate in tracking database 302 each of the transmitted identifiers with a status of being picked up by service person 401 (and/or by the carrier represented by service person 401).

A similar procedure may also be used for dropping-off, rather than picking up, monetary packages 307A-C. In that case, the status of each identified monetary package would be transmitted to centralized tracking system 101, which would update tracking database 302 to indicate that those monetary packages are now in the possession of the subsequent entity in the cash supply chain.

Figure 5:
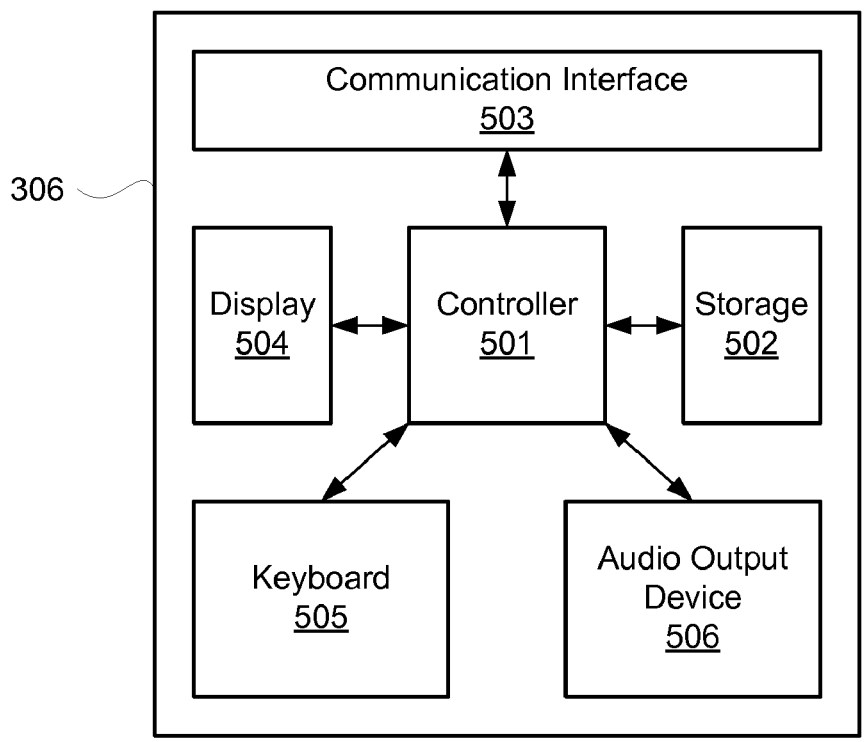
FIG. 5 is a functional block diagram of an illustrative RFID scanner that may be used by the armored carrier.

FIG. 5 is an illustrative functional block diagram of RFID scanner 306. In this example, RFID scanner 306 may include a controller 501, storage 502, a communication interface 503, a display 504, a keyboard 505, and an audio output device 506.

Controller 501 may be any unit configured to control, or assist in the control of, the various functions of RFID scanner 306. For example, controller 501 may be or include a processor.

Storage 502 may be any computer-readable medium, such as memory or a hard drive. Storage 502 may store any data utilized by RFID scanner 306 as well as any computer-executable instructions that may be used by controller 501. Thus, some or all of the functions performed by controller 501 (and indeed by RFID scanner 306 as a whole) may be in accordance with computer-executable instructions stored in storage 502.

Communication interface 503 may include a radio-frequency transmitter and/or a radio-frequency receiver for wirelessly communicating in a uni-directional or bi-directional manner with the RFID tags of bags 307A-C and/or with any other entity external to RFID scanner 306 such as third party system 305 (and ultimately with centralized tracking system 101) and/or via any other wireless communication channel. The terms "transmitter" and "receiver" is considered to include not only single transmitters and receivers, but also sets of multiple sub-transmitters and sub-receivers each configured to operate at different frequencies and/or communication protocols. For example, the "transmitter" may be configured to communicate at a first frequency and using a first protocol with an RFID tag of a bag, and also at a second frequency and using a second protocol with third party system 305.

In the present example of FIG. 5, RFID scanner also includes display 504, which may be any type of display or other visual user output device. Display 504 may or may not be configured to receive user input such as touch input.

RFID scanner 306 in this example also includes keyboard 505, which allows for user input via one or more buttons. Where display 504 is capable of interpreting user input, RFID scanner 306 may use such user input directed to display 504 rather than user input to keyboard 505.

Audio output device 506 may be configured to emit any type of sound, such as beeping, buzzing, clicking, musical tones, voice, or any other sound. Audio output device 506 may be configured, for example, as a speaker or piezo-electric acoustic device. As will be described further below, audio output device 506 may be used to alert service person 401 of a particular event or status, such as a missing monetary package.

Figure 6:
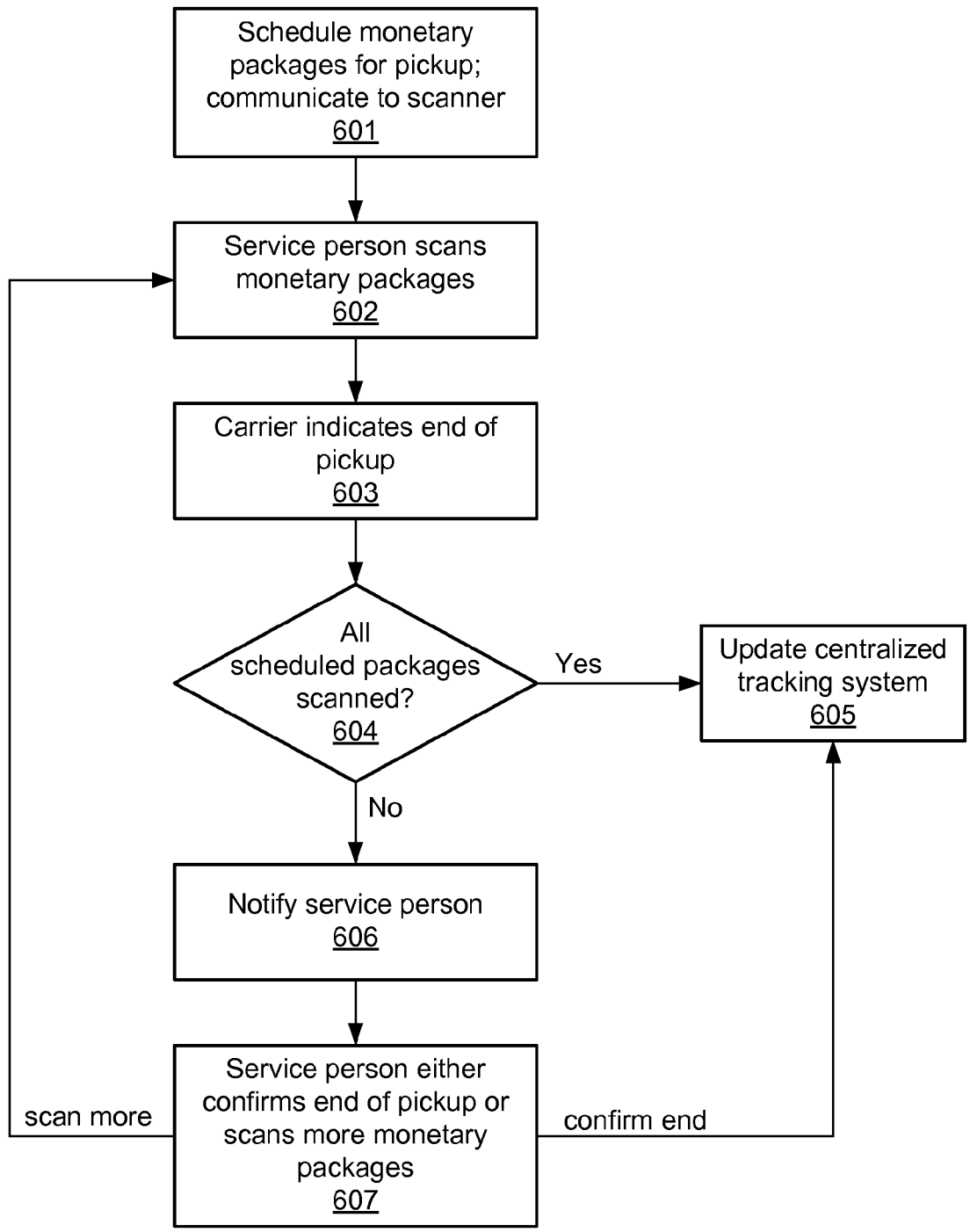
FIG. 6 is a flow chart of illustrative steps that may be taken to pick up one or more monetary packages.

FIG. 6 is a flow chart of illustrative steps that may be performed in picking up pre-scheduled monetary package deposits at deposit location 103. In step 601, the bank customer who wishes to deposit bags 307A-C may wish to pre-schedule the deposits for pickup. To do so, the customer may use, for instance, the web site provided by web server 303 to indicate the identifiers associated with bags 307A-C, and indicate that these bags are desired for pickup. Thus, each bag 307A-C may already have an RFID tag with a unique identifier. The customer may further identify the contents of each bag if desired. The result of this scheduling is that tracking database 302 may be updated with the scheduled identifiers and an associated indication that they are expected for pick up at a particular location (in this example, deposit location 103). Of course, the customer does not necessarily need to schedule the deposits ahead of pickup, however such scheduling will be assumed for purposes of the present example. In addition, centralized tracking system 101 may send data representing the schedule to RFID scanner 306, e.g., via third party system 305. Thus, RFID scanner 306 may now have a list of bag identifiers that are scheduled for pickup at deposit location 103.

Service person 401 may later arrive at deposit location 103 (either per a predetermined regular pickup schedule or in response to the scheduling performed in step 601). Service person 401 may indicate (e.g., via user input) to RFID scanner 306 the present location (in this example, deposit location 103) and/or RFID scanner 306 may automatically determine the present location such as using global positioning system (GPS) technology. In step 602, when RFID scanner 306 in possession of service person 401 comes within scanning range of bags 307A-C, then RFID scanner 306 will sense their presence and determine each of their associated identifiers as transmitted by their respective RFID tags. In this example, all three of bags 307A-C have been scheduled for pickup.

When service person 401 believes that all monetary packages have been accounted for and are in the presence of RFID scanner 306, then in step 603 service person 401 may provide user input (e.g., in the form of a press of a button of keyboard 505 or input to display 504) to indicate that the pickup of monetary packages has been completed. In step 604, the identified monetary packages actually scanned may be compared with a list of those monetary packages scheduled for pickup for the identified pickup location (which may be have been input by service person 401 and/or determined by GPS). Thus, RFID scanner 306 may simultaneously store multiple lists of identifiers, each list associated with a different pickup location. Alternatively, RFID scanner 306 may receive each list on demand from centralized tracking system 101 each time it is in a new pickup location. It could also be determined if the person handling the bags had permission or access to handle the bags.

In step 604, if there is a complete match between the set of expected identifiers and the actual scanned identifiers, then the process moves to step 605. For example, if all three bags 307A-C are scheduled for pickup, and all three are recognized by RFID scanner 306, then the process moves to step 605. However, if one or more of bags 307A-C are not scanned, then the process moves to step 606.

In step 605, RFID scanner 306 may send an update message centralized tracking system 101 with the new status of bags 307A, 307B, and/or 307C, via communication interface 503 and/or third party system 305. In response, centralized tracking system 101 may update the status of each bag 307A, 307B, and/or 307C identified by the update message in tracking database 302.

Returning to step 604, if not all of the scheduled bags 307A-C have been scanned by RFID scanner 306 (per a comparison of the set of expected identifiers and the actual scanner identifiers), then RFID scanner 306 may notify service person 401 in step 606. Such a notification may be, for instance, an audio and/or visual notification. For example, controller 501 may cause audio output device 506 to emit a sound, and/or may cause display 504 to display a message indicating that one or more of the expected monetary packages have not been scanned. RFID scanner 306 may also at this point send a notification message, via communication interface 503 and/or third party system 305, to centralized tracking system 101.

In step 607, RFID scanner 306 may await user input from service person 401 in response to the displayed and/or heard notification. This user input may take the form of, for example, a confirmation that, despite the missing bag, the pickup should be considered completed. If so, then RFID scanner 306 may perform step 605 by updating centralized tracking system 605 of the monetary packages scanned, and including a status indication that one or more expected specific monetary packages were not scanned. This situation may occur where the customer has changed his or her mind as to how many monetary packages to deposit, or where a monetary package has simply gone missing.

If, at step 607 (or at any time), RFID scanner 306 detects the missing monetary package's identification tag using communication interface 503, then the process may move automatically to step 605, with the correct status of each monetary package updated to centralized tracking system 101.

The process shown in FIG. 6 is merely illustrative, and many variations may be performed while still being within the scope of the invention. For example, monetary packages do not necessarily need to be scheduled prior to pick up.

Figure 7:
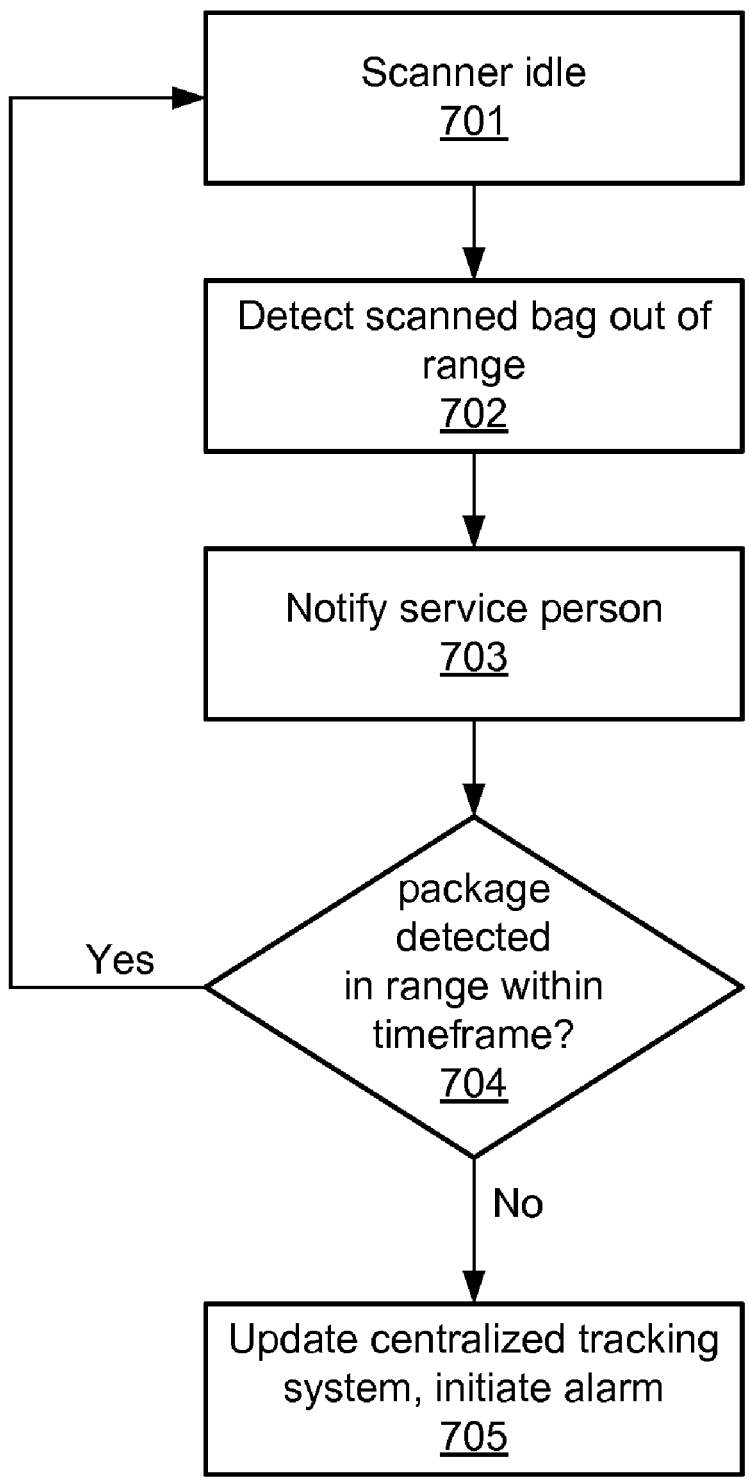
FIG. 7 is a flow chart of illustrative steps that may be performed to detect and notify a carrier and/or a centralized system of a potentially missing monetary package.

FIG. 7 is a flow chart showing an illustrative process that may be performed using RFID scanner 306, for detecting whether a previously scanned monetary package is no longer within scanning range of RFID scanner 306. The process of FIG. 7 may be run independently of, or in parallel with, the process of FIG. 6.

In step 701, RFID scanner 701 may be idle or may be at any point in the process of FIG. 6. For each monetary package scanned by RFID scanner 701, the identifier of that monetary package may be stored in storage 502. An indicator as to the current status of that monetary package may also be stored in storage 502. Examples of such current status per the indicator may include, for instance, a time and/or location of pickup of the monetary package, a planned location of drop off of the monetary package, whether the monetary package is currently considered to be within the custody of service person 401, and/or whether the monetary package is currently loaded in armored vehicle 402.

RFID scanner 306 may periodically or continuously perform an inventory check using communication interface 503 to determine which of the monetary packages currently considered in the custody of service person 401 (as indicated in storage 502) are still within RFID scanning range. If any of those monetary packages cannot be detected (i.e., if their respective RFID tags cannot be read), then the process moves to step 702 (detect monetary package out of range) and then to step 703. In step 703, responsive to detecting a monetary package out of range in step 702, RFID scanner 306 notifies service person 401. This notification, like the notification in step 606, may be audible and/or visual.

RFID scanner 306 may also, in response to detecting the monetary package out of range, start a timer. This time may be of any length of time, such as but not limited to less than one minute or more than one minute. In step 704, RFID scanner 306 determines whether that previously "lost" monetary package has been re-acquired via communication interface 503 within the timeframe as determined by the timer. If so, then the process may return to idle (step 701) or wherever RFID scanner 306 left off prior to entering step 702.

If the lost monetary package is not re-acquired within the timeframe, then RFID scanner 306 may alert service person 401 (using an audio and/or visual alert) and/or centralized tracking system 101 with a status update message indicating that the status of the monetary package is that it is missing or otherwise unaccounted for. Of course, if the lost monetary package is later re-acquired even after the timeframe, the process may return to step 701 and/or send another message to centralized tracking system 101 indicating that the status is now that the monetary package is again within the custody of service person 401. RFID scanner 306 may further notify service person 401 using an audio and/or visual alert that the monetary package has again return within scanning range.

Thus, systems and methods have been described that may provide additional security of monetary packages throughout the cash supply chain. Although certain examples have been described in connection with an armored carrier pickup of a deposit, various aspects as described herein may also be used for other points along the cash supply chain, such as within the bank's vault.

The invention claimed is:

1. A method, comprising:
   receiving data representing a plurality of identifiers of monetary packages scheduled for pickup, the plurality being based on a location of a radio frequency identification (RFID) scanner and a time schedule of the monetary packages scheduled for pickup;
   wirelessly detecting, by the RFID scanner, a presence of RFID tags of a plurality of monetary packages at the location, each of the RFID tags indicating an identifier;
   responsive to a subsequent loss of detected presence of one of the RFID tags, generating a first alert;
   determining whether the presence of the one of the RFID tags is again detected, and if not, then generating a second alert;
   comparing the identifiers of the detected RFID tags with the plurality of identifiers; and
   responsive to determining that the detected identifiers of the RFID tags match the plurality of identifiers, wirelessly sending data representing a status of each of the detected identifiers of the RFID tags.

2. The method of claim 1, wherein generating the first alert comprises generating an audible alert, and generating the second alert comprises wirelessly transmitting data.

3. The method of claim 1, wherein generating the second alert comprises wirelessly transmitting data representing the identifier of the one of the RFID tags.

4. The method of claim 1, wherein determining comprises determining whether the presence of the one of the RFID tags is again detected within a predetermined period of time, and if not, then generating the second alert.

5. An apparatus, comprising:
a global positioning system device configured to determine a location of the apparatus;
a radio frequency transmitter configured to send data identifying the determined location;
a radio frequency receiver configured to receive radio frequency transmissions from identification tags of a plurality of monetary packages, and to receive data representing a plurality of identifiers of monetary packages scheduled for pickup, the plurality being based on the determined location and a time schedule of the monetary packages scheduled for pickup;
an audio output device; and
a controller configured to:
determine whether the radio frequency transmissions are continuing to be detected by the radio frequency receiver,
responsive to determining that one of the radio frequency transmissions has discontinued as detected by the radio frequency receiver, cause the audio output device to emit sound,
determine whether the one of the radio frequency transmissions as detected by the radio frequency receiver have begun again, and if not, cause the radio frequency transmitter to transmit first data,
compare identifiers of the plurality of identification tags with the plurality of identifiers represented by the received data, and
responsive to determining that the identifiers of the plurality of identification tags match the plurality of identifiers represented by the received data, causing the radio frequency transmitter to wirelessly transmit data representing a status of each of the identifiers of the plurality of identification tags.

6. The apparatus of claim 5, the radio frequency transmissions comprise second data representing the identifiers of the monetary packages.

7. The apparatus of claim 5, wherein the controller is further configured to transmit the first data responsive to determining that the one of the radio frequency transmissions as detected by the radio frequency receiver has not begun again within a predetermined period of time.

8. A method, comprising:
receiving, by a radio frequency receiver of an apparatus, data representing a plurality of identifiers of monetary packages scheduled for pickup, the plurality being based on a location of the apparatus and a time schedule of the monetary packages scheduled for pickup;
wirelessly detecting, by the apparatus, a presence of radio frequency identification (RFID) tags of a plurality of monetary packages at the location, each of the RFID tags indicating an identifier;
responsive to a subsequent loss of detected presence of one of the RFID tags, generating by the apparatus a first alert;
determining, by the apparatus, whether the presence of the one of the RFID tags is again detected, and if not, then generating by the apparatus a second alert;
comparing, by the apparatus, the identifiers of the detected RFID tags with the plurality of identifiers; and
responsive to determining that the detected identifiers of the RFID tags match the plurality of identifiers, wirelessly sending, by a radio frequency transmitter of the apparatus, data representing a status of each of the detected identifiers of the RFID tags.

9. The method of claim 8, wherein generating the first alert comprises generating an audible alert, and generating the second alert comprises wirelessly transmitting data.

10. The method of claim 8, wherein generating the second alert comprises wirelessly transmitting by the radio frequency transmitter data representing the identifier of the one of the RFID tags.

11. The method of claim 8, wherein determining comprises determining whether the presence of the one of the RFID tags is again detected within a predetermined period of time, and if not, then generating the second alert.

12. An apparatus, comprising:
a radio frequency transmitter configured to send data identifying a location of the apparatus;
a radio frequency receiver configured to receive radio frequency transmissions from identification tags of a plurality of monetary packages, and to receive data representing a plurality of identifiers of monetary packages scheduled for pickup, the plurality being based on the location of the apparatus and a time schedule of the monetary packages scheduled for pickup;
an audio output device; and
a controller configured to:
determine whether the radio frequency transmissions are continuing to be detected by the radio frequency receiver,
responsive to determining that one of the radio frequency transmissions has discontinued as detected by the radio frequency receiver, cause the audio output device to emit sound,
determine whether the one of the radio frequency transmissions as detected by the radio frequency receiver have begun again, and if not, cause the radio frequency transmitter to transmit first data,
compare identifiers of the plurality of identification tags with the plurality of identifiers represented by the received data, and
responsive to determining that the identifiers of the plurality of identification tags match the plurality of identifiers represented by the received data, causing the radio frequency transmitter to wirelessly transmit data representing a status of each of the identifiers of the plurality of identification tags.

13. The apparatus of claim 12, the radio frequency transmissions comprise second data representing the identifiers of the monetary packages.

14. The apparatus of claim 12, wherein the controller is further configured to transmit the first data responsive to determining that the one of the radio frequency transmissions as detected by the radio frequency receiver has not begun again within a predetermined period of time.

* * * * *